(12) United States Patent
Marupaduga

(10) Patent No.: US 11,265,751 B1
(45) Date of Patent: Mar. 1, 2022

(54) DYNAMIC AIR-INTERFACE RECONFIGURATION BASED ON INTER-ACCESS-NODE DATA FLOW FOR DUAL-CONNECTIVITY SERVICE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 21 days.

(21) Appl. No.: 16/878,405

(22) Filed: May 19, 2020

(51) Int. Cl.
    *H04W 88/10*     (2009.01)
    *H04W 28/02*     (2009.01)
    *H04W 76/15*     (2018.01)

(52) U.S. Cl.
    CPC ....... *H04W 28/0205* (2013.01); *H04W 76/15* (2018.02)

(58) Field of Classification Search
    CPC .......................... H04W 28/0205; H04W 76/15
    See application file for complete search history.

(56) References Cited

U.S. PATENT DOCUMENTS

| | | | |
|---|---|---|---|
| 8,891,467 B2 | 11/2014 | Awoniyi et al. | |
| 9,544,902 B1 | 1/2017 | Narendran et al. | |
| 10,070,419 B2 * | 9/2018 | Huang | H04L 5/14 |
| 10,462,629 B2 | 10/2019 | Bhattad et al. | |
| 10,681,598 B1 * | 6/2020 | Sitaram | H04W 36/26 |
| 10,716,158 B1 * | 7/2020 | Pawar | H04L 5/0058 |
| 10,834,637 B1 * | 11/2020 | Pawar | H04W 28/0226 |
| 10,887,923 B2 * | 1/2021 | Comstock | H04L 5/00 |
| 10,979,986 B1 * | 4/2021 | Brisebois | H04L 43/0876 |
| 10,993,117 B2 * | 4/2021 | Pu | H04W 48/12 |
| 10,993,151 B2 * | 4/2021 | Sadek | H04L 1/00 |
| 2015/0043492 A1 * | 2/2015 | Baek | H04W 76/15 370/329 |
| 2015/0098322 A1 * | 4/2015 | Chen | H04W 28/0252 370/230 |
| 2015/0350955 A1 * | 12/2015 | Somasundaram | H04W 72/1252 370/329 |
| 2016/0183261 A1 * | 6/2016 | Koorapaty | H04L 5/0051 370/239 |
| 2016/0219604 A1 * | 7/2016 | Fujishiro | H04W 36/04 |
| 2017/0289889 A1 * | 10/2017 | Sahu | H04L 5/0098 |
| 2018/0368199 A1 * | 12/2018 | Zeng | H04W 72/0413 |

(Continued)

*Primary Examiner* — Parth Patel

(57) ABSTRACT

When a user equipment device (UE) has dual connectivity including a first air-interface connection extending from a first access node to the UE and a second air-interface connection extending from a second access node to the UE, and where an inter-access-node interface extends between the first access node and the second access node, a method includes (i) detecting that a flow of downlink data over the inter-access-node interface from the first access node to the second access node, for transmission of the downlink data over the second air-interface connection to the UE, is threshold high and (ii) based at least on the detecting, increasing downlink bandwidth of the second air-interface connection. Increasing the downlink bandwidth of the second air-interface connection could involve, for instance, replacing a carrier of the connection with another carrier that has a wider downlink frequency bandwidth, among other possibilities.

20 Claims, 4 Drawing Sheets

(56) References Cited

U.S. PATENT DOCUMENTS

| | | |
|---|---|---|
| 2019/0037417 A1* | 1/2019 | Lei ...................... H04W 72/085 |
| 2019/0149184 A1* | 5/2019 | Jung ........................ H04B 1/40 |
| | | 455/90.2 |
| 2019/0253908 A1* | 8/2019 | Fan ....................... H04W 24/08 |
| 2019/0357131 A1* | 11/2019 | Sivavakeesar ........ H04W 76/19 |
| 2020/0068430 A1* | 2/2020 | Chan .................... H04W 24/08 |
| 2020/0084682 A1* | 3/2020 | Wang .................... H04W 28/18 |
| 2020/0112875 A1* | 4/2020 | Peng ..................... H04W 76/11 |
| 2020/0163139 A1* | 5/2020 | Wang ...................... H04W 8/08 |
| 2020/0236677 A1* | 7/2020 | Cui ....................... H04W 24/02 |
| 2020/0314941 A1* | 10/2020 | Bai ........................ H04B 7/022 |
| 2020/0323007 A1* | 10/2020 | Teyeb ................... H04W 76/15 |
| 2021/0051744 A1* | 2/2021 | Wang ................... H04W 52/365 |
| 2021/0051767 A1* | 2/2021 | Zhang ................ H04W 72/0413 |
| 2021/0092629 A1* | 3/2021 | Fang ..................... H04W 24/10 |
| 2021/0111851 A1* | 4/2021 | Lin ....................... H04W 24/10 |
| 2021/0168689 A1* | 6/2021 | Shimoda ........... H04W 36/0069 |
| 2021/0168690 A1* | 6/2021 | Zheng ................... H04W 76/15 |
| 2021/0219204 A1* | 7/2021 | Shi ......................... H04W 4/40 |

\* cited by examiner

DYNAMIC AIR-INTERFACE RECONFIGURATION BASED ON INTER-ACCESS-NODE DATA FLOW FOR DUAL-CONNECTIVITY SERVICE

BACKGROUND

A cellular wireless network typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could operate on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be characterized by a center frequency and particular bandwidth (width of frequency) centered on that center frequency. In LTE, example channel bandwidths include 1.4 MHz, 3 MHz, 5 MHz, 10 MHz, 15 MHz, and 20 MHz. In 5G NR, on the other hand, example channel bandwidths include 20 MHz, 40 MHz, 50 MHz, 60 MHz, 100 MHz, and up to 400 MHz.

On the downlink and uplink, the air interface provided by an access node on a given carrier could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served UEs.

In addition, certain resources on the downlink and/or uplink of the air interface could be reserved for special purposes.

On the downlink, for instance, certain resource elements in each downlink subframe could be generally reserved to define a downlink control channel for carrying control signaling such as PRB-allocation directives and the like to served UEs, and other resource elements in each downlink subframe could be generally reserved to define an uplink shared channel in which the PRBs noted above can be allocated to carry data from the access node to UEs. Further, certain resource elements in designated downlink subframes could be reserved to carry synchronization signals that UEs could detect as an indication of coverage, other resource elements in designated downlink subframes could be reserved to carry system information messages, and still other resource elements distributed in a defined pattern throughout each downlink subframe could be reserved to carry a reference signal that UEs could measure in order to determine coverage strength.

And on the uplink, certain resource elements in each uplink subframe could be generally reserved to define an uplink control channel for carrying control signaling such as scheduling requests from UEs to the access node, and other resource elements in each uplink subframe could be generally reserved to define an uplink shared channel in which the PRBs noted above can be allocated to carry data from UEs to the access node. Further, certain resource elements on the uplink could be specially reserved to carry other uplink signals, such as random access signals, sounding reference signals, and the like.

Other air-interface configurations are possible as well.

OVERVIEW

When a UE enters into coverage of an example network, the UE could detect threshold strong coverage of an access node on a particular carrier (e.g., a threshold strong reference signal broadcast by the access node on the carrier) and could then engage in random-access and connection signaling, such as Radio Resource Control (RRC) signaling, to establish an air-interface connection (e.g., RRC connection) through which the access node will then serve the UE on that carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including (i) an access-bearer portion that extends between the access node and a core-network gateway that provides connectivity with a transport network and (i) a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in the downlink control channel of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE, in the downlink channel of a preceding subframe, a DCI message that designates those upcoming PRBs. And the UE could then accordingly transmit the transport block to the access node in the designated PRBs.

An access node that is configured to operate on more than one carrier may also provide a UE with carrier-aggregation service, serving the UE on a combination of multiple carriers at once to help provide the UE with increased peak data rate of communication.

To configure carrier-aggregation service for a UE when the UE is connected with the access node on a given carrier, the access node could add one or more carriers to the UE's air-interface connection. For instance, the access node could update a context record for the UE's connection to indicate the multiple carriers, and the access node could transmit to the UE an RRC connection-reconfiguration message or the like that lists the multiple carriers, so that the UE can be prepared to operate on those multiple carriers. With carrier-aggregation configured, the access node could then schedule downlink communications to the UE on PRBs across the multiple carriers in the UE's connection. And if uplink carrier-aggregation is supported, the access node could also schedule uplink communications from the UE on PRBs across the multiple carriers.

In addition, when the industry advances from one generation of wireless technology to the next, or in other scenarios, networks and UEs may also support dual-connectivity service, where a UE is served on co-existing connections according to multiple different RATs.

For instance, the network could be equipped with a one access node that provides coverage and service according to a first RAT ("first-RAT access node") and another access node that provides overlapping coverage and service according to a second RAT ("second-RAT access node"), and a UE positioned within coverage of the access nodes could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, the first-RAT access node could operate as a master node (MN), responsible for coordinating setup and teardown of dual-connectivity service for the UE and possibly functioning as an anchor point for RRC signaling and core-network control signaling related to the dual-connectivity service, and the second-RAT access node could function as a secondary node (SN), mainly to provide added connectivity and increased aggregate bandwidth for the UE.

When the UE enters into coverage of such a system, the UE could initially scan for and discover threshold strong first-RAT coverage of the MN on a given carrier, and the UE could responsively engage in signaling as discussed above to establish a first-RAT air-interface connection between the UE and the MN on that carrier. Further, the UE could engage in attach signaling with a core-network controller via the MN, and the core-network controller and MN could coordinate establishment for the UE of at least one user-plane bearer as discussed above. In addition, if the MN and UE support carrier aggregation service, the MN might add one or more additional carriers to the UE's first-RAT connection. The MN could then serve the UE in a standalone mode with packet-data communications in the manner described above on the one more carriers of the UE's first-RAT connection.

Further, perhaps having determined from profile data that the UE is dual-connectivity-capable, the MN could trigger and/or engage in a process to establish for the UE a second-RAT air-interface connection between the UE and an SN, so that the MN and SN can then cooperatively provide the UE with dual-connectivity service. For instance, the MN could direct the UE to scan for secondary coverage under the second RAT, possibly identifying one or more SNs and carriers for which the UE should scan, and could receive in response from the UE a report that the UE detected threshold strong coverage of one or more SNs on one or more carriers. And the MN could then coordinate setup of dual-connectivity service so that the UE can be served concurrently by the MN and an SN.

While the specifics of setting up dual-connectivity may vary from implementation to implementation, in an example, the MN could engage in signaling with the SN, with the UE, and with the core-network controller, to coordinate setup of the dual-connectivity service. For instance, the MN could engage in signaling with the UE and with the SN to coordinate setup of a second-RAT connection between the UE and the SN on one or more second-RAT carriers. And the MN could engage in signaling with the core-network controller and/or with the SN to coordinate setup of a split bearer for the UE (e.g., for each of one or more user-plane bearers established for the UE) so that the MN could then serve a portion of the UE's data communications and the SN could serve another portion of the UE's data communications.

In a representative split-bearer arrangement, the UE's access bearer could be anchored and split at one of the UE's serving access nodes, so that access node can serve a portion of the UE's data communications over its air-interface connection with the UE, and another portion of the UE's data communications could flow over an inter-access-node interface such as an X2 interface between the access nodes so that the other access node could serve that other portion of the UE's data communications.

By way of example, the access bearer could stay anchored at the MN, and the MN could split the bearer, handling a portion of the UE's data communications itself and exchanging another portion of the UE's data communications with the SN so that the SN could handle that other portion. With this arrangement, when the gateway has data to transmit to the UE, that data could flow from the gateway to the MN, the MN could schedule and provide transmission of a portion of that data over the UE's first-RAT connection to the UE as discussed above, and the MN could transmit another portion of the data over an X2 interface to the SN, which could schedule and provide transmission of that other portion of data over the UE's second-RAT connection to the UE as discussed above. And the reverse of these communication paths could be used for uplink communication from the UE.

As another example, the access bearer could be transferred from being anchored at the MN to being anchored instead at the SN, and the SN could split the bearer, handling a portion of the UE's data communications itself and exchanging another portion of the UE's data communications with the MN so that the MN could handle that other portion. With this arrangement, when the gateway has data to transmit to the UE, that data could flow from the gateway to the SN, the SN could schedule and provide transmission of a portion of that data over the UE's second-RAT connection to the UE as discussed above, and the SN could transmit another portion of the data over an X2 interface to the MN, which could schedule and provide transmission of that other portion of data over the UE's first-RAT connection to the UE as discussed above. And here too, the reverse of these communication paths could be used for uplink communication from the UE.

One technical issue that can arise in a dual-connectivity configuration with a bearer split at one of the UE's serving access nodes is that that access node may send to the UE's other serving access node a large quantity of data for transmission to the UE but the other access node may not have sufficient air-interface capacity to suitably handle that transmission to the UE. One issue here may be that the downlink bandwidth of the carrier(s) on which the other access node is serving the UE may be relatively narrow, defining a relatively small number of PRBs per unit time for carrying downlink data transmissions. Further, an additional issue may issue may be that PRB-utilization on the carrier(s) may be relatively high In practice, as downlink data arrives at the access node where the bearer is split, that access node may decide how much of that data to send over the X2 interface to the other access node for transmission to the UE. But the access node may not take into consideration the downlink carrier bandwidth on which the other access node serves the UE. Therefore, the quantity of data that the access node sends over the X2 interface to the other access node may exceed what the other access node can handle.

The present disclosure provides a mechanism to help address this issue. According to the disclosure, in a scenario where first and second access nodes are cooperatively serving a UE with dual connectivity, a determination will be made that a threshold high quantity of data is flowing over an inter-access-node interface from the first access node to the second for transmission of the data to the UE. And based at least in part on that determination, the second access node will then reconfigure its air-interface connection with the UE to increase downlink bandwidth of the connection, in order to help accommodate that inter-access-node flow of data.

With an MN and SN as described above, the first access node could be either the MN or the SN, and the second access node could be the other of the MN and SN.

In practice, the second access node could increase the downlink bandwidth of its air-interface connection with the UE by adding to the connection one or more carriers, possibly as a replacement for one or more narrower-bandwidth carriers of the connection, and/or possibly to supplement one or more carriers already encompassed by the connection.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, such as EUTRA-NR Dual Connectivity (EN-DC). With EN-DC, a 4G access node (4G evolved Node-B (eNB)) typically functions as the MN, and a 5G access node (5G next-generation Node-B (gNB)) typically functions as the secondary access node. Thus, a UE would first establish a standalone-4G connection with a 4G eNB, and the 4G eNB could then coordinate setup of EN-DC service for the UE, including setup for the UE of a secondary 5G connection with a 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
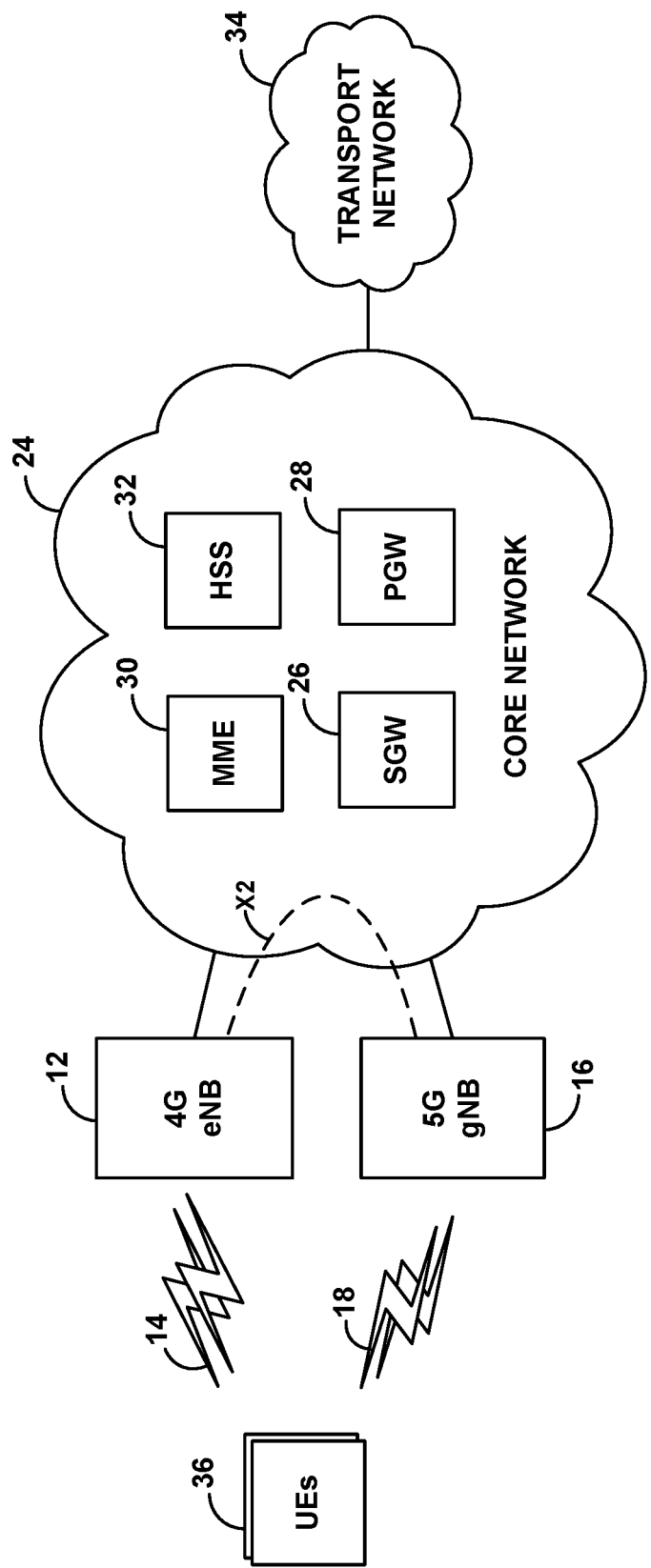
FIG. 1 is a simplified block diagram of an example network arrangement in which features of the present disclosure can be implemented.

FIG. 1 depicts an example network having a 4G eNB 12 that is configured to provide 4G service on each of multiple example 4G carriers 14 and an example 5G gNB 16 that is configured to provide 5G service on each of one or more example 5G carriers 18, with an X2 interface (e.g. packet tunnel) defined between the two access nodes. Each of these access nodes could be a macro access node of the type configured to provide a wide range of coverage or could take other forms, such as a small cell access node, a repeater, a femtocell access node, or the like, which might be configured to provide a smaller range of coverage, among other possibilities. Further, these access nodes could be collocated with each other and could provide coverage in largely the same direction as each other, to define an area in which UEs can engage in both 4G service provided by the 4G eNB 12 and 5G service provided by 5G gNB 16.

In representative 4G and 5G implementations, each carrier could be FDD or TDD and could be identified by a respective Absolute Radio Frequency Channel Number (ARFCN), perhaps an E-UTRA ARFCN (EARFCN). If a carrier is FDD, the carrier would have separate downlink and uplink channels, and each of these channels would have a respective center frequency and a respective bandwidth. Whereas, if a carrier is TDD, the carrier would have a single channel with a center frequency and bandwidth, and the access node could configure the air-interface on the carrier to have a particular downlink-uplink configuration that establishes what percentage of time the carrier will be downlink versus uplink, thus defining effective downlink and uplink bandwidths of the carrier (e.g., by multiplying the percentage by the carrier's actual bandwidth).

Further, the air interface on each carrier could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs. Although carrier-structure and/or service on the 4G and 5G air-interfaces could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown, the example 4G and 5G access nodes in the example arrangement are each connected with a core network 24, which could be an Evolved Packet Core (EPC) network or Next Generation Core (NGC) network, among other possibilities. In the example shown, the core network includes a serving gateway (SGW) 26, a packet data network gateway (PGW) 28, a mobility management entity (MME) 30, and an element management system (EMS) 32, although other arrangements are possible as well.

In an example implementation, without limitation, the X2 interface between the access nodes could be defined through this core network 24. Further, each access node could have an interface through the core network 24 with the SGW 26, the SGW 26 could have an interface with the PGW 28, and the PGW 28 could provide connectivity with a transport network 34. In addition, each access node could have an interface through the core network 24 with the MME 30, and the MME 30 could have an interface with the SGW 26, so that the MME 30 could coordinate setup of bearers for UEs to enable the UEs to engage in packet-data communications. Alternatively, just the 4G eNB 12 might have an interface with the MME 30 and may function as an anchor for core-network control signaling with the MME 30 both for 4G service and for 5G service with EN-DC. Still further, the EMS 32 could operate as a central repository of operational data for the wireless communication network and to control and manage operation of various network elements.

FIG. 1 further depicts various example UEs 36 that may from time to time be within coverage of the 4G and 5G access nodes and may from time to time be served by the access nodes. In a representative implementation, each such UE may be 4G, 5G, and EN-DC capable. For instance, each UE could include both a 4G radio and associated equipment and logic that enables the UE to connect with and be served by a 4G eNB and a 5G radio and associated equipment and logic that enables the UE to connect with and be served by a 5G gNB. And each UE may include logic that enables the UE to be served with and engage in EN-DC service.

In line with the discussion above, upon entering into coverage of the access nodes as shown, a representative UE 36 could initially scan for 4G coverage and discover threshold strong coverage of 4G eNB 12 on a given carrier. For instance, the UE could discover a synchronization signal broadcast at the center frequency of the carrier, the UE could then read a broadcast master information block (MIB) on the carrier to determine the carrier's bandwidth, and the UE could measure strength of a reference signal on the carrier and determine that the reference signal is strong enough to justify connecting.

The UE could then engage in random access signaling and RRC signaling with the 4G eNB 12 to establish a 4G connection on the given carrier as discussed above. Further, if appropriate, the UE could engage in attach signaling with the MME 30 through the 4G connection, and the MME 30 could coordinate setup of one or more user-plane bearers for the UE as discussed above, with each such bearer including an access-bearer that includes an S1-U tunnel between the 4G eNB 12 and the SGW 26 and an S5 tunnel between the SGW 26 and the PGW 28 and a DRB tunnel between the 4G eNB 12 and the UE. And the 4G eNB 12 could establish a context record for the UE, indicating the UE's RRC-connected state and indicating the carrier on which the 4G eNB 12 is serving the UE.

In addition, as noted above, the 4G eNB 12 might configure carrier aggregation service for the UE. To do so, the 4G eNB 12 could add one or more additional carriers 14 to the UE's 4G connection, updating the UE's context record accordingly and sending an RRC connection configuration message to the UE to notify the UE. A representative such RRC connection reconfiguration message could specify each of multiple carriers now encompassed by the UE's connection, designating each carrier by its ARFCN and/or other characteristics such as center frequency and bandwidth of one or more carrier channels for instance.

Further, the 4G eNB 12 could configure EN-DC service for the UE, to enable the UE to be served concurrently by the 4B eNB 12 and the 5G gNB 16.

For instance, the 4G eNB 12 could transmit to the UE a "B1" (inter-RAT) measurement object that directs the UE to scan for 5G coverage, possibly identifying the various 5G carriers 18 on which the 5G gNB 16 provides service, and the 4G eNB 12 could then receive in response from the UE a measurement report indicating that the UE detects threshold strong coverage on one or more such carrier. The 4G eNB 12, as an MN, could then engage in process to add the 5G gNB 16 as an SN for the UE, such as by transmitting to the 5G gNB 16 an SN-Addition request to cause the 5G gNB 16 to allocate resources for a 5G connection for the UE on one or more such 5G carriers, receiving an SN-Addition-Request acknowledge message from the 5G gNB 16, and engaging in associated RRC signaling with the UE, in response to which the UE could then access and complete establishment of the 5G connection.

In addition, as part of the EN-DC-configuration process, the 4G eNB 12 could also work to establish for the UE a split bearer for each of one or more user-plane bearers established for the UE.

In line with the discussion above, for instance, this bearer split could be at the 4G eNB 12, in which case the 4G eNB 12 could set itself to operate with the bearer split and could signal to the 5G gNB 16 to prepare the 5G gNB 16 to operate with the bearer split. When data destined to the UE flows over the S1-U tunnel from the SGW 26 to the 4G eNB 12, (i) the 4G eNB 12 could then send a portion of that data over the X2 interface to the 5G gNB 16, and the 5G gNB 16 could schedule and provide transmission of that portion of the data over the 5G connection to the UE and (ii) the 4G eNB 12 could itself schedule and provide transmission of the remainder of the data over the 4G connection to the UE. Here, the 4G eNB 12 could apply any of various processes to apportion the UE's downlink data handling between itself and the 5G gNB 16.

Alternatively, the bearer split could be at the 5G gNB 16. To facilitate this, the 4G eNB 12 could signal to the MME 30 to trigger transfer of the S1-U portion of the bearer from being between the SGW 26 and the 4G eNB 12 to being instead between the SGW 26 and the 5G gNB 16, and the 4G eNB could signal to the 5G gNB 16 to prepare the 5G gNB to operate with the bearer split. In this case, when data destined to the UE flows over the S1-U tunnel from the SGW 26 to the 5G gNB 16, (i) the 5G gNB 16 could then send a portion of that data over the X2 interface to the 4G eNB 12, and the 4G eNB 12 could schedule and provide transmission of that portion of the data over the 4G connection to the UE and (ii) the 5G gNB 16 could itself schedule and provide transmission of the remainder of the data over the 5G connection to the UE. And here, the 5G gNB 16 could apply any of various processes to apportion the UE's downlink data handling between itself and the 4G eNB 12.

As noted above, a problem that can arise with this split-bearer arrangement when a UE is served with dual connectivity by a first access node and by a second access node is that the quantity of data that the first access node sends over the X2 interface for transmission by the second access node to the UE may be more than the second access node can conveniently handle on its existing air-interface connection with the UE. For instance, due to the limited downlink bandwidth of the carrier(s) on which the second access node's air-interface connection with the UE is currently configured, and perhaps also considering the level of load (e.g., PRB utilization) on the carrier(s), the high rate of downlink data flow over the X2 interface may result in a buffer overflow and associated packet loss at the second access node.

As indicated above, the present disclosure provides for addressing this issue by detecting when there is a threshold high level (e.g., threshold high rate) of downlink data flow over the X2 interface from the first access nodes to second access node and, based at least on that detecting, dynamically increasing the downlink bandwidth of the second access node's air-interface connection with the UE.

By way of example, if the UE's bearer split (as to one or more bearers) is at the 4G eNB 12, and if the flow of the UE's downlink data over the X2 interface from the 4G eNB 12 to the 5G gNB 16 is at least as high as a threshold high rate, the result could be a backup at the 5G gNB 16 of data destined to the UE, which may result in packet loss or other problems. To help this issue, a determination could be made that the rate of flow of the UE's downlink data over the X2 interface from the 4G eNB 12 to the 5G gNB 16 is threshold high. And based on at least that determination, the 5G gNB 16 could reconfigure its 5G connection with the UE to increase the downlink bandwidth of the connection.

And as another example, if the UE's bearer split (as to one or more bearers) is at the 5G gNB 16, and if the flow of the UE's downlink data over the X2 interface from the 5G eNB 16 to the 4G eNB 12 is at least as high as a threshold high rate, the result could be a backup at the 4G eNB 12 of data destined to the UE, which may result in packet loss or other problems. Similarly here, to help this issue, a determination could be made that the rate of flow of the UE's downlink data over the X2 interface from the 5G gNB 16 to the 4G eNB 12 is threshold high. And based on at least that determination, the 4G eNB 12 could reconfigure its 4G connection with the UE to increase the downlink bandwidth of the connection.

In these example implementations, the act of determining that the rate of the UE's downlink data flow over the X2 interface from the first access node to the second access node could be carried out by the second access node, by the first access node, or perhaps by the EMS 32, among other possibilities. In any case, the determination could be made by monitoring the rate of such downlink data flow over the X2 interface from the first access node to the second access node, perhaps over a sliding window of time, and detecting when that rate is at least as high as the threshold high rate, perhaps allowing for some hysteresis.

If the second access node makes this determination, the second access node could then proceed, based at least on the determination, to increase the downlink bandwidth of its connection with the UE. Whereas, if the first access node makes this determination, the first access node could then inform the second access node, and, based at least on the determination, the second access node could then proceed to increase the downlink bandwidth of its connection with the UE. And likewise, if the EMS 32 makes this determination, the EMS could then inform the second access node, and, based at least on that determination, the second access node could then proceed to increase the downlink bandwidth of its connection with the UE.

The threshold high rate of data flow considered in this analysis could be predefined, deemed by engineering design or other process to be a rate of data flow that is likely to pose an issue. Further or alternatively, the threshold could be defined based on the existing downlink bandwidth of the air-interface connection between the second access node and the UE, based on a level of load of the connection, and/or based on one or more other factors, with the threshold likewise representing a rate of data flow that is likely to pose an issue.

Through this or another process, the decision to increase the downlink bandwidth of the UE's connection with the second access node could be additionally based on one or more factors in addition to the threshold high rate of the UE's downlink data flow over the X2 interface from the first access node to the second access node.

For instance, the decision could additionally be based on a determination that the air-interface connection between the second access node and the UE is threshold heavily loaded. This could be based on a determination that there is threshold high downlink PRB utilization (e.g., percentage of downlink PRBs being allocated per unit time) on the carrier(s) on which the air-interface connection is defined and/or on a determination that the second access node has a threshold high quantity of data buffered for transmission over the connection to the UE, among other possibilities. In an example implementation, the second access node or the EMS could make these or other such determinations as additional factors to inform the decision of whether the second access node should increase the downlink bandwidth of its connection with the UE.

The act of increasing the downlink bandwidth of the air-interface connection between the second access node and the UE could then take various forms as well. As one example, the second access node could add one or more additional carriers to the connection (e.g., configuring carrier-aggregation service for the UE and/or adding one or more additional carriers to an existing set of multiple carriers on which the connection is defined). And as another example, the second access node could swap one of the carriers of the connection for another carrier that has a wider downlink bandwidth. For instance, if the connection is currently defined on a carrier having 10 MHz downlink bandwidth, the second access node could reconfigure the connection to replace that carrier with one that has a 20 MHz downlink bandwidth.

As noted above, in this process, the downlink bandwidth of a TDD carrier could be considered the effective downlink bandwidth of the TDD carrier, such as the actual bandwidth of the TDD carrier prorated by the portion of time that the carrier is downlink. Alternatively, the downlink bandwidth of the TDD carrier could be considered the actual bandwidth of the TDD carrier without regard to its downlink-uplink configuration.

The second access node could so reconfigure the UE's connection in an example implementation by updating its own records to indicate the change and by directly or indirectly signaling to the UE to inform the UE of the change. If the second access node is set to engage in RRC signaling with the UE, for instance, then the second access node could generate and transmit to the UE an RRC connection reconfiguration message that indicates the carrier(s) now encompassed in the UE's connection with the second access node, perhaps specifying each carrier by its ARFCN and other information such as center frequency and bandwidth. Whereas, if the second access node is not set to engage in RRC signaling with the UE, then the second access node could transmit over the X2 interface to the first access node (e.g., as X2AP signaling) a message indicating the carrier(s) now encompassed by the UE's connection, and the first access node could responsively generate and transmit to the UE an RRC connection reconfiguration message that provides that information regarding the UE's connection with the second access node.

The second access node could then proceed to serve the UE on the connection having the increased downlink bandwidth. For instance, the second access node could schedule and provide transmission of data to the UE, including any currently buffered downlink data and any additional downlink data flowing over the X2 interface from the first access node to the second access node.

In an example implementation, the second access node could also automatically revert to the earlier bandwidth of the UE's connection after expiration of a defined timer period and/or upon a determination being made (again by any of the entities noted above, among other possibilities) that the rate of flow of the UE's downlink data over the X2 interface from the first access node to the second access node is no longer threshold high and/or has become threshold low. Thus, the second access node could reconfigure the UE's connection again, this time reducing the bandwidth of the connection perhaps back to what it was initially, among other possibilities.

Figure 2:
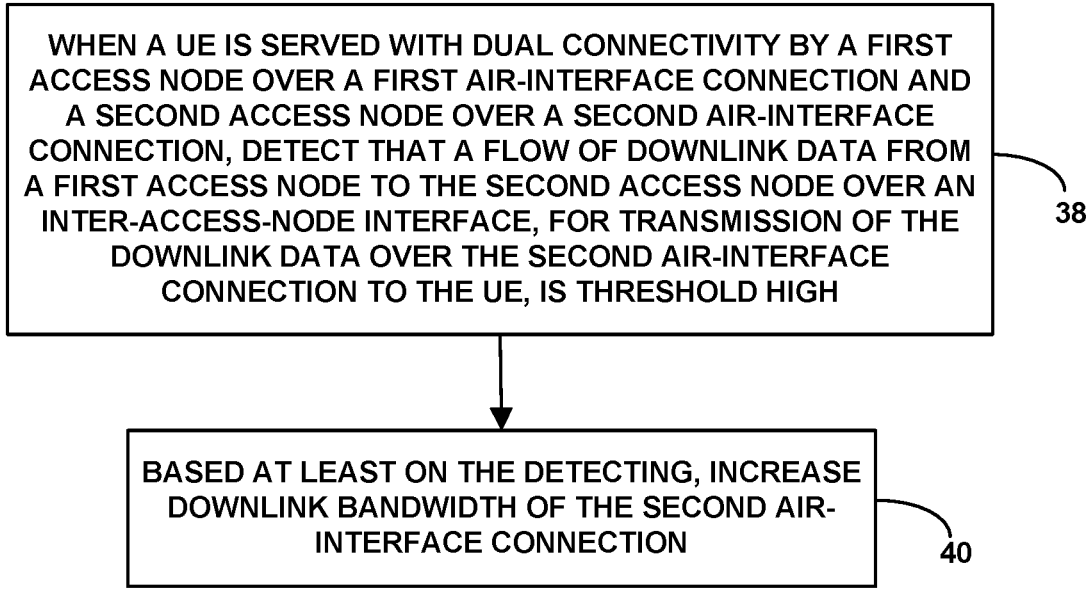
FIG. 2 is a flow chart depicting an example method in accordance with the present disclosure.

FIG. 2 is next a flow chart depicting an example method for controlling an air-interface connection of a UE. As discussed above, the method could be operable in a wireless communication system when a UE has dual connectivity including a first air-interface connection extending between a first access node and the UE and a second air-interface connection extending between a second access node and the UE, and where an inter-access-node interface extends between the first access node and the second access node. Further, as noted above, one of the air-interface connections might be 4G LTE, the other might be 5G NR, and the dual connectivity might be EN-DC.

As shown in FIG. 2, at block 38, the method includes detecting that a flow of downlink data from the first access node to the second access node over the inter-access-node interface, for transmission of the downlink data over the second air-interface connection to the UE, is threshold high. And at block 40, the method includes, based at least on the detecting, increasing downlink bandwidth of the second air-interface connection.

In line with the discussion above, the act of increasing downlink bandwidth of the second air-interface connection could involve reconfiguring the second air-interface connection from being defined on one or more radio-frequency carriers (RF) having a first downlink frequency bandwidth to being defined instead on one or more RF carriers having a second downlink frequency bandwidth greater than the first downlink frequency bandwidth. For instance, the reconfiguring could involve adding to the second air-interface connection one or more RF carriers and/or replacing a first carrier of the second air-interface connection with second carrier having wider downlink frequency bandwidth than the first carrier. Further, the reconfiguring could involve transmitting to the UE a connection-reconfiguration message that specifies a new configuration of the second air-interface connection.

In addition, as discussed above, the act of detecting that the flow of downlink data from the first access node to the second access node over the inter-access-node interface, for transmission of the downlink data over the second air-interface connection to the UE, is threshold high, could be carried out by the second access node or by the first access node. And if the first access node carries out the detecting, the method could additionally include signaling from the first access node to the second access node in response to the detecting, to facilitate the increasing of the downlink bandwidth of the second air-interface connection. Further, the act of detecting that the flow of downlink data from the first access node to the second access node is threshold high could involve detecting that a rate of the flow of the downlink data is at least as high as a defined threshold.

As further discussed above, the act of increasing the downlink bandwidth of the second air-interface connection could be additionally based on a determination that the second air-interface connection is threshold highly loaded, perhaps based on downlink buffer occupancy at the second access node (e.g., extent of data buffered, awaiting transmission by the second access node over the second air interface).

Figure 3:
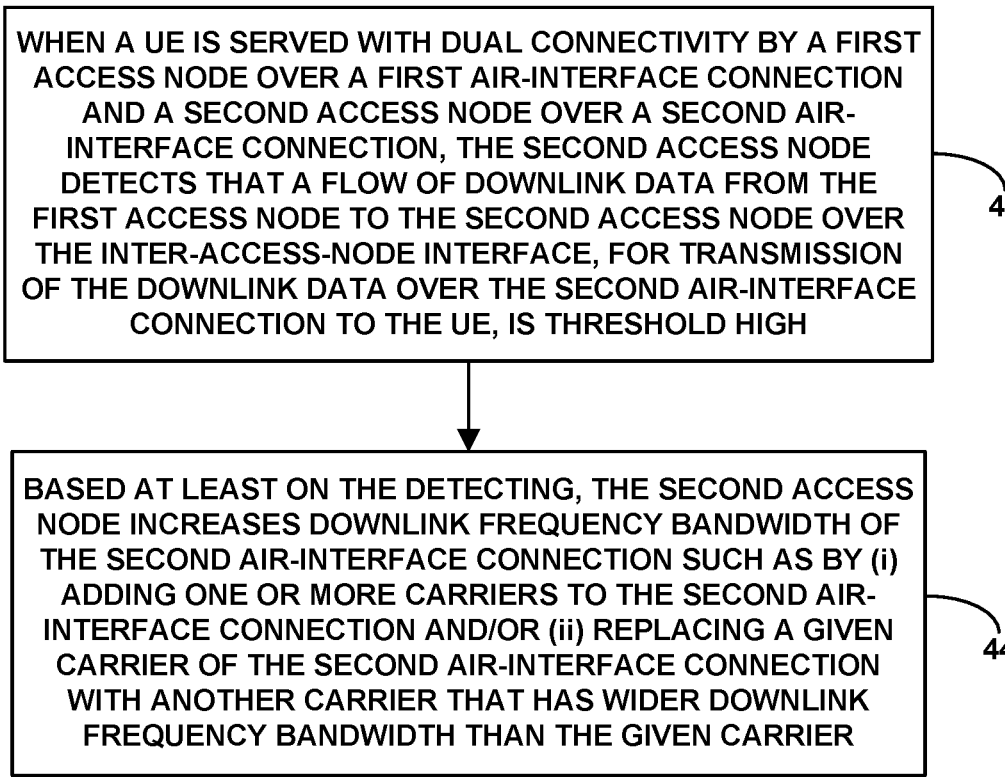
FIG. 3 is another flow chart depicting an example method in accordance with the present disclosure.

FIG. 3 is next another flow chart depicting an example method for controlling an air-interface connection of a UE in a context similar to that discussed above. As shown in FIG. 3, at block 42, the method includes the second access node detecting that a flow of downlink data from the first access node to the second access node over the inter-access-node interface, for transmission of the downlink data over the second air-interface connection to the UE, is threshold high. And at block 44, the method then includes, based at least on the detecting, the second access node increasing downlink frequency bandwidth of the second air-interface connection such as by (i) adding one or more radio frequency (RF) carriers to the second air-interface connection and/or (ii) replacing a given carrier of the second air-interface connection with another carrier that has wider downlink frequency bandwidth than the given carrier.

Various other features discussed herein can be implemented in this context as well, and vice versa.

Figure 4:
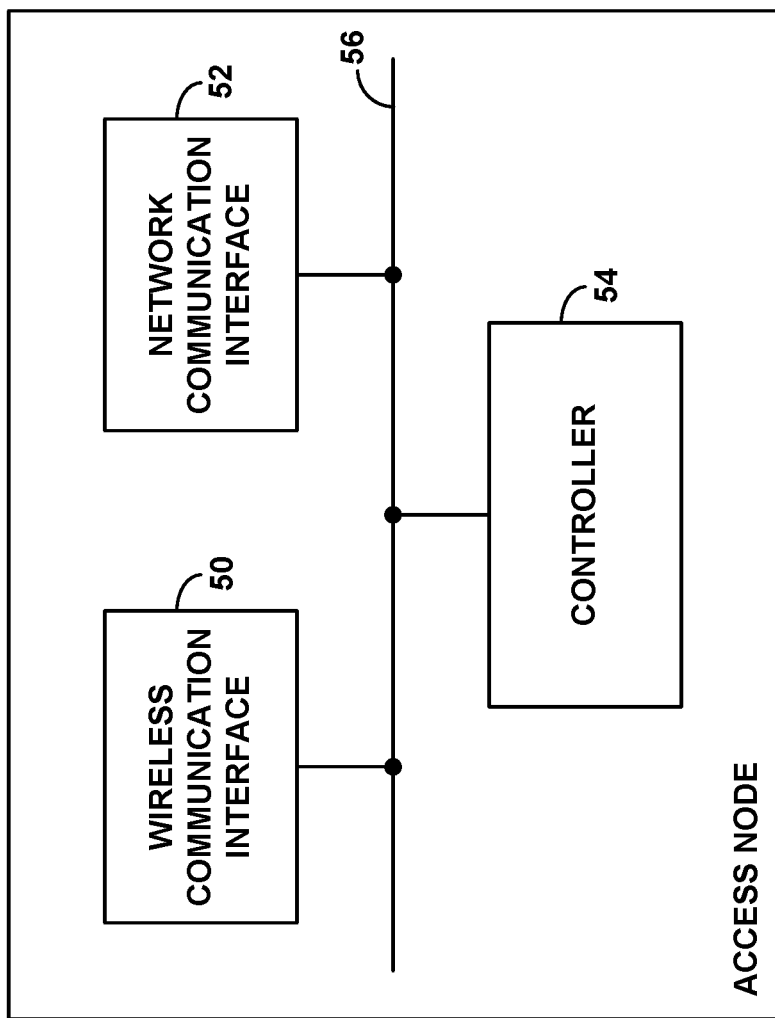
FIG. 4 is a simplified block diagram of an example access node operable in accordance with the present disclosure.

FIG. 4 is next a simplified block diagram depicting an example second access node that could operate in accordance with the present disclosure, in a wireless communication system including a first access node configured to provide service according to a first radio access technology (RAT) and the second access node configured to provide service according to a second RAT, and including an inter-access-node interface extending between the first access node and the second access node.

As shown, the example second access node includes a wireless communication interface 50, a network communication interface 52, and a controller 54, all of which may be communicatively linked together by a system bus, network, or other connection mechanism 56.

In this example second access node, the wireless communication interface 50 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of user-plane data and control-plane signaling over the air interface in accordance with the second RAT. And the network communication interface 52 could comprise a wired or wireless interface, such as an Ethernet network communication interface, configured to support communication with other entities, such as with the other access node and various core-network entities.

Further, controller 54 could comprise at least one processing unit (e.g., one or more general purpose processors and/or specialized processors) programmed to cause the second access node to carry out various operations such as those discussed above. For instance, the controller could comprise at least one non-transitory data storage (e.g., one or more magnetic, optical, or flash storage components) holding program instructions executable by the at least one processing unit to cause the second access node to carry out such operations when a UE has dual connectivity including a first air-interface connection extending between the first access node and the UE and a second air-interface connection extending between the second access node and the UE.

In line with the discussion above, the operations could include determining that a flow of downlink data from the first access node to the second access node over the inter-access-node interface, for transmission of the downlink data over the second air-interface connection to the UE, is threshold high. And the operations could include, based at least on the determining, increasing downlink bandwidth of the second air-interface connection.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method operable in a wireless communication system when a user equipment device (UE) has dual connectivity including a first air-interface connection extending between a first access node and the UE and a second air-interface connection extending between a second access node and the UE, wherein an inter-access-node interface extends between the first access node and the second access node, the method comprising:

detecting, by the second access node, that a flow of downlink data from the first access node to the second access node over the inter-access-node interface, for transmission of the downlink data over the second air-interface connection to the UE, is threshold high; and based at least on the detecting, increasing, by the second access node, downlink frequency bandwidth of the second air-interface connection, wherein increasing the downlink frequency bandwidth of the second air-interface connection comprises at least one operation selected from the group consisting of (i) adding one or more radio frequency (RF) carriers to the second air-interface connection and (ii) replacing a given carrier of the second air-interface connection with another carrier that has wider downlink frequency bandwidth than the given carrier.

2. The method of claim 1, wherein increasing downlink frequency bandwidth of the second air-interface connection comprises reconfiguring the second air-interface connection from being defined on one or more RF carriers having a first downlink frequency bandwidth to being defined instead on one or more RF carriers having a second downlink frequency bandwidth greater than the first downlink frequency bandwidth.

3. The method of claim 2, wherein reconfiguring the second air-interface connection comprises adding to the second air-interface connection one or more RF carriers.

4. The method of claim 2, wherein reconfiguring the second air-interface connection comprises replacing the given carrier of the second air-interface connection with the other carrier that has wider downlink frequency bandwidth than the given carrier.

5. The method of claim 2, wherein reconfiguring the second air-interface connection comprises transmitting to the UE a connection-reconfiguration message that specifies a new configuration of the second air-interface connection.

6. The method of claim 1, wherein the increasing of the downlink bandwidth of the second air-interface connection is additionally based on a determination that the second air-interface connection is threshold highly loaded.

7. The method of claim 6, wherein the determination that the second air-interface connection is threshold highly loaded is based on downlink buffer occupancy at the second access node.

8. The method of claim 1, wherein detecting that the flow of downlink data over the inter-access-node interface from the first access node to the second access node, for transmission of the downlink data over the second air-interface connection to the UE, is threshold high comprises detecting that a rate of the flow of the downlink data is at least as high as a defined threshold.

9. The method of claim 1, wherein one of the first air-interface connection and second air-interface connection is a 4G Long Term Evolution (4G LTE) connection and the other of the first air-interface connection and the second air-interface connection is a 5G New Radio (5G NR) connection.

10. The method of claim 9, wherein the dual connectivity comprises EUTRA-NR Dual Connectivity (EN-DC).

11. The method of claim 1, wherein detecting that the flow of downlink data over the inter-access-node interface from the first access node to the second access node, for transmission of the downlink data over the second air-interface connection to the UE, is threshold high comprises receiving over the inter-access-node interface from the first access node signaling indicating that the flow of downlink data is threshold high.

12. In a wireless communication system comprising a first access node configured to provide service according to a first radio access technology (RAT) and a second access node configured to provide service according to a second RAT, wherein an inter-access-node interface extends between the first access node and the second access node, the second access node comprising:
- a wireless communication interface through which to engage in air-interface communication and provide the service according to the second RAT; and
- a controller, wherein the controller is configured to cause the second access node to carry out operations when a user equipment device (UE) has dual connectivity including a first air-interface connection extending from the first access node and the UE and a second air-interface connection extending between the second access node and the UE, the operations including:
    - detecting that a flow of downlink data from the first access node to the second access node over the inter-access-node interface, for transmission of the downlink data over the second air-interface connection to the UE, is threshold high, and
    - based at least on the determining, increasing downlink frequency bandwidth of the second air-interface connection,
    - wherein increasing the downlink frequency bandwidth of the second air-interface connection comprises at least one operation selected from the group consisting of (i) adding one or more radio frequency (RF) carriers to the second air-interface connection and (ii) replacing a given carrier of the second air-interface connection with another carrier that has wider downlink frequency bandwidth than the given carrier.

13. The second access node of claim 12, wherein increasing downlink frequency bandwidth of the second air-interface connection comprises reconfiguring the second air-interface connection from being defined on one or more RF carriers having a first downlink frequency bandwidth to being defined instead on one or more RF carriers having a second downlink frequency bandwidth greater than the first downlink frequency bandwidth.

14. The second access node of claim 13, wherein reconfiguring the second air-interface connection comprises adding to the second air-interface connection one or more RF carriers.

15. The second access node of claim 13, wherein reconfiguring the second air-interface connection comprises replacing the given carrier of the second air-interface connection with the other carrier that has wider downlink frequency bandwidth than the given carrier.

16. The second access node of claim 13, wherein reconfiguring the second air-interface connection comprises transmitting to the UE a connection-reconfiguration message that specifies a new configuration of the second air-interface connection.

17. The second access node of claim 12, wherein detecting that the flow of downlink data over the inter-access-node interface from the first access node to the second access node, for transmission of the downlink data over the second air-interface connection to the UE, is threshold high comprises receiving over the inter-access-node interface from the first access node signaling indicating that the flow of downlink data is threshold high.

18. The second access node of claim 12, wherein the increasing of the downlink frequency bandwidth of the second air-interface connection is additionally based on a determination that the second air-interface connection is threshold highly loaded.

19. The second access node of claim 12, wherein
- detecting that the flow of downlink data over the inter-access-node interface from the first access node to the second access node, for transmission of the downlink data over the second air-interface connection to the UE, is threshold high comprises detecting that a rate of the flow of the downlink data is at least as high as a defined threshold.

20. The second access node claim 12, wherein one of the first air-interface connection and second air-interface connection is a 4G Long Term Evolution (4G LTE) connection and the other of the first air-interface connection and the second air-interface connection is a 5G New Radio (5G NR) connection.

* * * * *